United States Patent
Thorburn

(10) Patent No.: US 9,640,995 B2
(45) Date of Patent: May 2, 2017

(54) APPARATUS AND METHOD FOR TRANSMISSION LINE CONTROL

(75) Inventor: Stefan Thorburn, Västerås (SE)

(73) Assignee: ABB RESEARCH LTD., Zurich (CH)

( * ) Notice: Subject to any disclaimer, the term of this patent is extended or adjusted under 35 U.S.C. 154(b) by 712 days.

(21) Appl. No.: 12/988,444

(22) PCT Filed: Apr. 17, 2009

(86) PCT No.: PCT/EP2009/054619
§ 371 (c)(1),
(2), (4) Date: Oct. 27, 2010

(87) PCT Pub. No.: WO2009/127732
PCT Pub. Date: Oct. 22, 2009

(65) Prior Publication Data
US 2011/0031936 A1    Feb. 10, 2011

(30) Foreign Application Priority Data
Apr. 18, 2008   (EP) ..................................... 08154763

(51) Int. Cl.
H02J 3/32   (2006.01)
H02J 3/34   (2006.01)
H02J 3/16   (2006.01)

(52) U.S. Cl.
CPC   *H02J 3/32* (2013.01); *H02J 3/16* (2013.01); Y02E 40/34 (2013.01)

(58) Field of Classification Search
CPC ...... H02J 3/005; H02J 3/16; H02J 3/32; H02J 9/062

(Continued)

(56) References Cited

U.S. PATENT DOCUMENTS

| 4,251,736 A | 2/1981 | Coleman |
| 4,677,309 A | 6/1987 | Ogawa |

(Continued)

FOREIGN PATENT DOCUMENTS

| DE | 3311299 A1 | 10/1984 |
| KR | 10-0840478 B1 | 6/2008 |

(Continued)

OTHER PUBLICATIONS

Kimbark, "A New Look at Shunt Compensation", IEEE Transactions on Power Apparatus and Systems, vol. PAS-102, No. 1, Jan. 1983, pp. 212-218.

(Continued)

*Primary Examiner* — Richard Isla Rodas
*Assistant Examiner* — David V Henze-Gongola
(74) *Attorney, Agent, or Firm* — Birch, Stewart, Kolasch & Birch, LLP

(57) ABSTRACT

An apparatus includes a converter having an AC side and a DC side, a switch adapted to be connected to a transmission line on a first side and connected to a load on a second side connected to the AC side, an energy storage device, connected to the DC side. In a first operating mode, the switch is closed, such that an energy storage current flows to/from the energy storage device to charge/discharge the energy storage device, respectively. In a second operating mode, the switch is open, preventing current from flowing from the transmission line to the converter, and the energy storage device supplies a direct current which is converted to an alternating current by the converter. In the first operating mode, the apparatus is configured such that power transfer on the transmission line corresponds to a surge impedance loading of the transmission line, by affecting the energy storage current.

13 Claims, 3 Drawing Sheets

(58) Field of Classification Search
USPC .......................................................... 307/46
See application file for complete search history.

(56) References Cited

U.S. PATENT DOCUMENTS

| | | | |
|---|---|---|---|
| 5,760,492 A | 6/1998 | Kanoi et al. | |
| 6,118,678 A * | 9/2000 | Limpaecher | H02M 5/4505 307/109 |
| 6,215,202 B1 * | 4/2001 | Luongo | H02J 15/00 307/23 |
| 6,295,215 B1 * | 9/2001 | Faria et al. | 363/37 |
| 6,518,767 B1 | 2/2003 | Roberts et al. | |
| 6,563,234 B2 * | 5/2003 | Hasegawa | H02J 3/16 307/46 |
| 6,747,370 B2 * | 6/2004 | Abe | H02J 3/1842 307/66 |
| 6,900,619 B2 | 5/2005 | Kehrli et al. | |
| 7,265,521 B2 * | 9/2007 | Kehrli et al. | 323/207 |
| 2003/0026114 A1 | 2/2003 | Hubert et al. | |
| 2005/0201127 A1 * | 9/2005 | Tracy et al. | 363/37 |
| 2005/0206343 A1 * | 9/2005 | Ichinose | H02J 9/08 320/126 |
| 2006/0208707 A1 * | 9/2006 | Jacobson et al. | 320/166 |
| 2007/0246943 A1 * | 10/2007 | Chang | H02J 3/28 290/44 |

FOREIGN PATENT DOCUMENTS

| | | | | |
|---|---|---|---|---|
| SE | WO 2006104449 A1 * | 10/2006 | | H02M 1/088 |
| WO | 2005/031940 A1 | 4/2005 | | |
| WO | WO 2007027141 A1 * | 3/2007 | | |
| WO | WO 2008002223 A1 * | 1/2008 | | |

OTHER PUBLICATIONS

Baggini, "Handbook of Power Quality," Static UPS System, Reliability of Electricity Supply: Appliances/Equipment, Apr. 15, 2008, ISBN: 978-0-470-06561-7, Seiten, pp. 435-437.
Emadi et al., "Uninterruptible Power Supplies and Active Filters," CRC Pr Inc., Oct. 28, 2004, ISBN-10: 0849330351, 4 pages.
Nelles, "Elektrische Energietechnik," 4.2.2 Stationarer Betrieb, 1998, ISBN: 3-519-06427-8, 2 pages.

* cited by examiner

APPARATUS AND METHOD FOR TRANSMISSION LINE CONTROL

FIELD OF INVENTION

The present invention relates generally to electric power transmission, and more particularly to improving the efficiency of electric transmission lines.

BACKGROUND

Transmission power lines have been used for more than a century to transmit power from a generation source to a source of consumption of electric power.

Over time, the transmission lines have been adapted to reduce power consumed by the transmission line itself, particularly in the case of long power lines.

U.S. Pat. No. 7,265,521 B2 discloses a system and approach for minimizing the step voltage change as seen by the utility customer as well as minimizing transients imposed on the fundamental waveform of a normal voltage carried on a utility power network when a reactive power source (e.g., capacitor bank) is instantaneously connected to the utility power. The reactive power source is adapted to transfer reactive power of a first polarity (e.g., capacitive reactive power) to the utility power network. The system includes a reactive power compensation device configured to transfer a variable quantity of reactive power of a second, opposite polarity to the utility power network, and a controller which, in response to the need to connect the shunt reactive power source to the utility power network, activates the reactive power compensation device and, substantially simultaneously, causes the shunt reactive power source to be connected to the utility power.

While the use of reactive power sources as described above do improve the efficiency of a transmission line, the performance of transmission lines would benefit from more improvement, particularly to improve transmission over long transmission lines.

SUMMARY OF THE INVENTION

An object of the present invention is to provide an apparatus and method to improve the performance of long transmission lines.

The invention is based on the realisation that using an energy storage device which is connected and disconnected, the transmission line can be operated at surge impedance loading when connected.

According to the invention there is provided an apparatus comprising:
a converter having an AC side and a DC side,
a switch adapted to be connected to a transmission line on a first side and the switch being adapted to be connected to a load on a second side, the second side also being connected to the AC side of the converter,
an energy storage device, connected to the DC side of the converter,
wherein in a first operating mode, the switch is closed, such that an energy storage current flows to or from the energy storage device to charge or discharge the energy storage device, respectively, using the converter for any necessary conversion between AC and DC, and
in a second operating mode, the switch is open, preventing current from flowing from the transmission line to the converter, and the energy storage device supplies a direct current which is converted to an alternating current by the converter,
characterised in that
in the first operating mode, the apparatus is configured such that a power transfer on the transmission line corresponds to a surge impedance loading of the transmission line, by affecting the energy storage current.

By charging the energy storage device in the first operating mode, the charging current and a current to the load both need to come from the power source through the transmission line. Consequently, this increase in current through the transmission line allows the transmission line to operate at surge impedance loading. By operating the transmission line at surge impedance loading, the reactive power of the transmission line is balanced, allowing for considerably longer transmission line distances. Operating the line at surge impedance loading also reduces the need for reactive shunt compensation commonly applied along the line to manage voltage variations caused by the changes in load transfer.

The invention is manly applicable for power transfers above 1 kV and 1 MW with an energy storage larger than 1 kWh.

The apparatus may be configured such that a power transfer on the transmission line corresponds to a surge impedance loading of the transmission line only in the first operating mode.

In the first operating mode, the apparatus may be in such a state that the energy storage current only charges the energy storage device.

The apparatus may further comprise a controller.

The controller may be configured to, in the first operating mode, control the power transfer on the transmission line to correspond to the surge impedance loading.

In the second operating mode, the controller may be configured to control frequency and voltage of the alternating current provided to the load. The apparatus may further comprise a voltmeter and a ammeter, both meters adapted to provide measurements to the controller.

The converter may comprise series connected high voltage circuits with embedded short circuit failure mode controlled with a pulse width modulation circuit.

The switch may be a transient free switch.

The apparatus may be configured to switch from the first operating mode to the second operating mode when the energy storage device is determined to be full.

The apparatus may be configured to switch from the second operating mode to the first operating mode when the energy storage device is determined to be below a threshold charge level.

The controller may be configured to control switching of the apparatus between the first and second operating modes.

A second aspect of the invention is a method for operating an apparatus comprising:
a converter having an AC side and a DC side,
a switch adapted to be connected to a transmission line on a first side and the switch being adapted to be connected to a load on a second side, the second side also being connected to the AC side of the converter,
an energy storage device, connected to the DC side of the converter,
the method comprising the steps of:
closing the switch, such that an energy storage current flows to or from the energy storage device to charge or discharge the energy storage device, respectively, using the converter for any necessary conversion between AC and DC, and opening the switch, preventing current from flowing from the transmission line to the converter, and the energy storage device supplies a direct current which is converted to an alternating current by the converter, characterised in that when the switch is closed, causing a power transfer on the transmission line to correspond to a surge impedance loading of the transmission line, by affecting the energy storage current.

The causing a power transfer on the transmission line to correspond to a surge impedance loading may in one embodiment only occur when the switch is closed.

The closing and opening of the switch may be repeated.

In closing the switch, the method may be configured such that the energy storage current only charges the energy storage device.

The opening of the switch may be performed when the energy storage device is determined to be full.

The closing may be performed when the energy storage device is determined to be below a threshold charge level.

It is to be noted that any features of the first aspect are applicable to the second aspect, and vice versa.

Generally, all terms used in the claims are to be interpreted according to their ordinary meaning in the technical field, unless explicitly defined otherwise herein. All references to "a/an/the element, device, component, means, step, etc." are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF DRAWINGS

The invention is now described, by way of example, with reference to the accompanying drawings, in which.

DETAILED DESCRIPTION OF PREFERRED EMBODIMENTS

The present invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
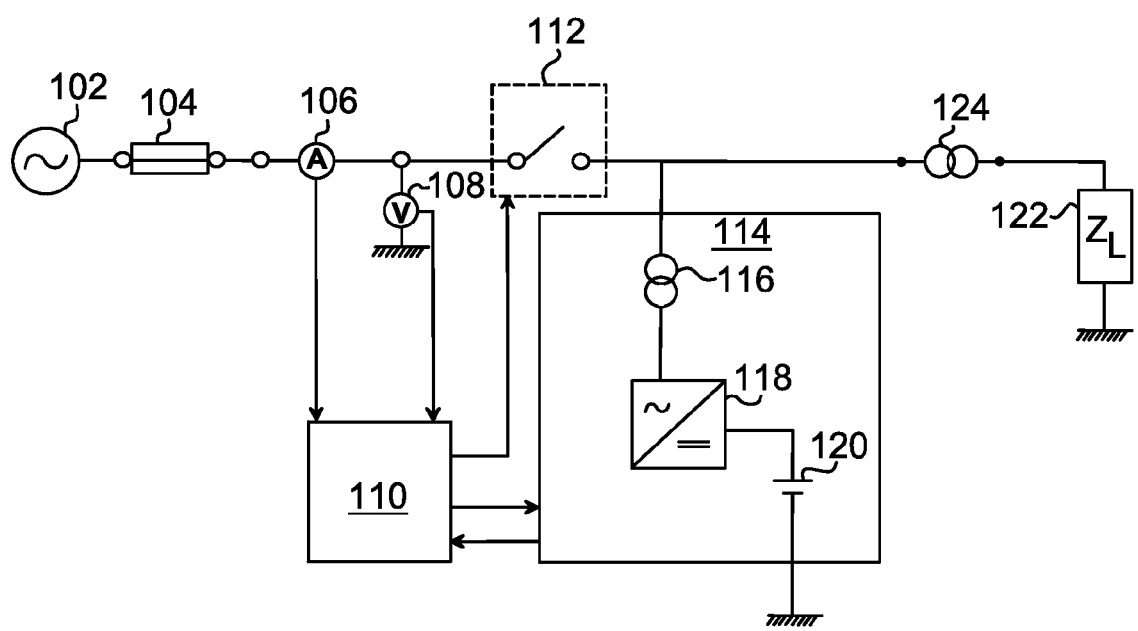
FIG. 1 is a schematic diagram showing a system where an embodiment of the present invention is employed.

FIG. 1 is a schematic diagram showing an environment where an embodiment of the present invention is employed for one phase.

A power source 102 provides an alternating current. As is known in the art, the power source can include generators, transformers, etc. (not shown), to provide an electric power suitable for distribution through a transmission line 104. At the other side of the transmission line 104, there is provided an ammeter 106, measuring the current, and a voltmeter 108 measuring the voltage.

Alternatively, the ammeter 106 and the voltmeter 108 are provided on the other side of the transmission line 104 and measurements are transported using a signal transmission means (not shown). This also allows for a so called black start capability, meaning that it can energize the load side from the stored energy and build up the grid operation from the stored energy.

A switch 112 connects or disconnects the power source to a load 122 and an energy storage system 114, as will be explained in more detail later. Typically, as known in the art per se, a transformer 124 transforms the voltage to a voltage that is suitable for the load 122. The load 122 can be any element or system consuming electric power, e.g. an industrial unit or an electric network for a city or town. The load 122 can furthermore include local generation, producing part of the load demand.

The energy storage system 114 optionally comprises a transformer 116 which, if necessary, converts the voltage between the transmission line 104 and a converter 118, ensuring the converter 118 is provided with a suitable voltage. The converter 118 has an AC (alternating current) side and a DC (direct current side). An energy storage device 120, such as a high capacity rechargeable battery 120 is connected to the DC side of the converter 118. Optionally, the energy storage system 114 comprises necessary controls and means to maintain a predefined AC frequency and AC voltage on the load side if no other equipment is present in the load representation having this responsibility.

The converter 118 can be implemented by an inverter and a rectifier. Optionally, the converter 118 is equipped with series connected high voltage circuits with embedded short circuit failure mode controlled with a pulse width modulation (PWM) circuit. The battery can comprise a large number of cells to meet the capacity requirements for the battery 120.

A controller 110 receives input from the ammeter 106 and the voltmeter 108 and provides output to the switch 112 and the energy storage system 114. The controller 110 can be a central processing unit (CPU), a digital signal processor (DSP), or any other electronic programmable logic device. In one embodiment, the controller 110 is embodied in a conventional server or a personal computer, with associated storage, input/output etc.

Now it will be explained the concept of surge impedance loading (SIL) and how this is utilised in the embodiment of the present invention.

SIL is reached when a natural reactive power balance is reached. At this load, the transmission line 104 neither absorbs nor produces reactive power. SIL can be expressed in the following formula:

$$SIL = \frac{V^2}{Z_0} \quad (1)$$

where V is the line to line voltage and $Z_0$ is the characteristic impedance of the transmission line 104. The characteristic impedance is not purely resistive; due to capacitive and inductive factors, there is a reactive component of $Z_0$. SIL in this equation is expressed in Watt, or VoltAmpere when Z0 is complex.

When operated at SIL, the transmission line 104 can be made considerably longer, as the limitation of any reactive unbalances of the transmission line 104 is removed. This allows for a given transmission line 104 of a given specification to be used more efficiently, i.e. at a higher rating, and for a longer distance. It may also reduce the needed amount of shunt and/or series connected reactive power compensation needed previously.

Additionally, embodiments of the present invention are applicable to reduce the so-called Ferranti effect. The Ferranti effect increases the voltage on the receiving end of the transmission line, when the load on the receiving end is significantly reduced or removed. With proper control from the controller 110 and use of the energy storage system 114, the voltage is kept within acceptable levels.

This means that, under the assumption that $Z_0$ is constant, for SIL to occur, either the voltage or the current needs to be adjusted.

Now, in the system shown in FIG. 1, when the switch 112 is closed, the current can be affected by controlling at what rate the battery 120 is charged. In other words, the controller 110 receives measurements of the voltage from the voltmeter 108. Knowing or determining $Z_0$, the controller 110 can determine a current or the corresponding power which should flow through the transmission line 104 to correspond to SIL. By obtaining measurements of the current from the ammeter 106, the controller 110 can thus determine whether a current to the energy storage system 114 needs to be increased or reduced for SIL to be reached. The controller 110 then instructs the energy storage system 114 to adjust the charging of the battery 120 accordingly. In one embodiment, the controller 110 sends commands to the energy storage system 114 to charge its battery at a particular power (Watts) or a particular current (Ampere).

Analogously, the controller 110 can control the energy storage system 114 to discharge the battery 120 to achieve SIL on the transmission line.

In one embodiment, this procedure of adjusting the current through the transmission line 104 can be repeated many times every second, e.g. with up to kHz switching in the device 118, to quickly reduce any deviations from SIL on the transmission line 104. It is to be noted that the operating mode when the switch 112 is closed, is here denoted a first operating mode.

Optionally, if the transmission line 104 is equipped with discrete shunt and/or series compensation, an equivalent wave impedance can be calculated, as seen from the transmission line terminations. The equivalent impedance fulfils the same requirements as an ideal line, i.e. no net reactive power transfer over the line. This equivalent value is then used in the controller.

When the controller 110 determines that the battery 120 is reaching a state when it is full, the controller 110 effects an opening of the switch 112. The operating mode when the switch 112 is open is here denoted a second operating mode.

The switch 112 can be a transient free switch, to minimize voltage stress on the load 122 or the generator 102 when the switch 112 is either opened or closed.

When the switch 112 is opened, there is no longer a current flowing from the power source 102 to the load 122. Instead, the power to the load 122 is provided from the energy storage system 114. The electric charge previously charged in the battery 120 is now released as a direct current and converted by the converter 118 to an alternating current. If necessary, the transformer 116 transforms the alternating current from the converter 118 to a voltage corresponding to the voltage previously provided through the power line. Consequently, as viewed from the load 122, a continuous and uniform power is being supplied, even though the source of the power has changed from the power source 102 to the energy storage system 114. Since, in the second operating mode, no power flows through the transmission line 104, no reactive (nor real) power is lost.

It is to be noted that this arrangement also allows for the energy storage unit to function as backup power for the load 122, in the case that either the power source 102 or the transmission line 104 causes an interruption in power supply.

When the battery 120 is determined to go below a threshold level, e.g. if it is getting near an empty state, the controller 110 effects a closing of the switch 112. The system is then again in the first operating mode and power flows through the transmission line 104 to the load 122 and controllably to the energy storage system 114, as described above, to reach SIL on the transmission line 104. Again, as viewed from the load 122, it is provided with a continuous and uniform supply of power. The opening and closing of the switch 112 is then repeated continuously.

Since the only real limitation factor for the frequency of opening and closing the switch 112 is the capacity of the battery, the battery can be connected and disconnected, respectively, for a relatively long time.

More specifically, the connection and disconnection does not need to happen every period of the alternating current. For example, depending on the battery capacity, the switch 112 can be closed, or open, respectively, for minutes or even hours. However, if desirable for other reasons, the controller 110 can control the opening and closing of the switch 112 to much shorter times, even milliseconds.

If longer transmission lines are desired than is possible with the system of FIG. 1, a plurality of the systems shown in FIG. 1 can be connected serially in segments (not shown). It is also possible to have a storage device in both ends of the line for cases where the power transfer direction varies due to seasonal or other reasons (not shown).

Figure 2:
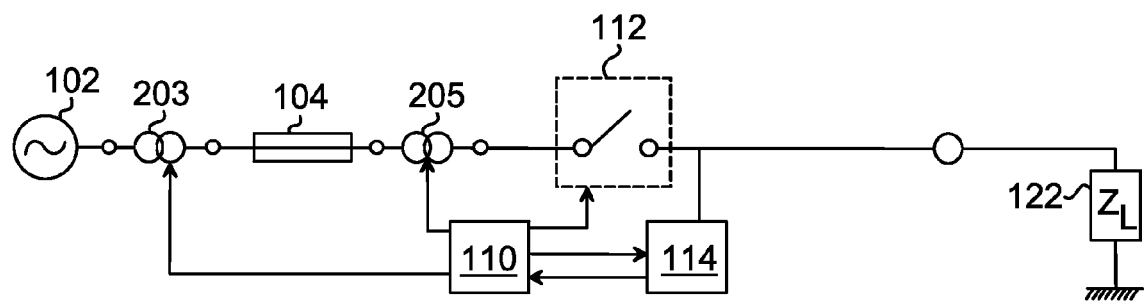
FIG. 2 shows the system of FIG. 1, where voltage control is also applied.

FIG. 2 shows the system of FIG. 1, where voltage control is also applied. The power source 102, the transmission line 104, the controller 110, the switch 112 and the energy storage system 114 are the same as those described in conjunction with FIG. 1 above. Other components of FIG. 1 have been omitted for reasons of clarity of FIG. 2.

As seen in equation (1) above, SIL can not only be reached by adjusting the current through the transmission line 104; voltage control can also be used to achieve this purpose. This has been described in detail in the international patent application WO2005/031940. The principle is to use two transformers 203, 205 with tap changing possibility on either side of the transmission line 104 to control the voltage in the transmission line 104 without affecting required voltage from the power source 102 or to the load 122. The controller 110 can in this case optimize the intermittent operation of the line to the available size of the energy storage while still transmit power at surge impedance level on the transmission line 104. This can be beneficial when using battery technology with constraints in charging/discharging rates. It can also be used to minimize total ohmic losses of the line, converter and battery system installation.

The controller 110 in this embodiment can thus be used, not only to affect the current flowing through the transmission line 104, but also to affect the voltage of the transmission line 104. The controller 110 can be used to either affect current or voltage, or it could be used to control both voltage and current at the same time, offering improved flexibility.

Figure 3:
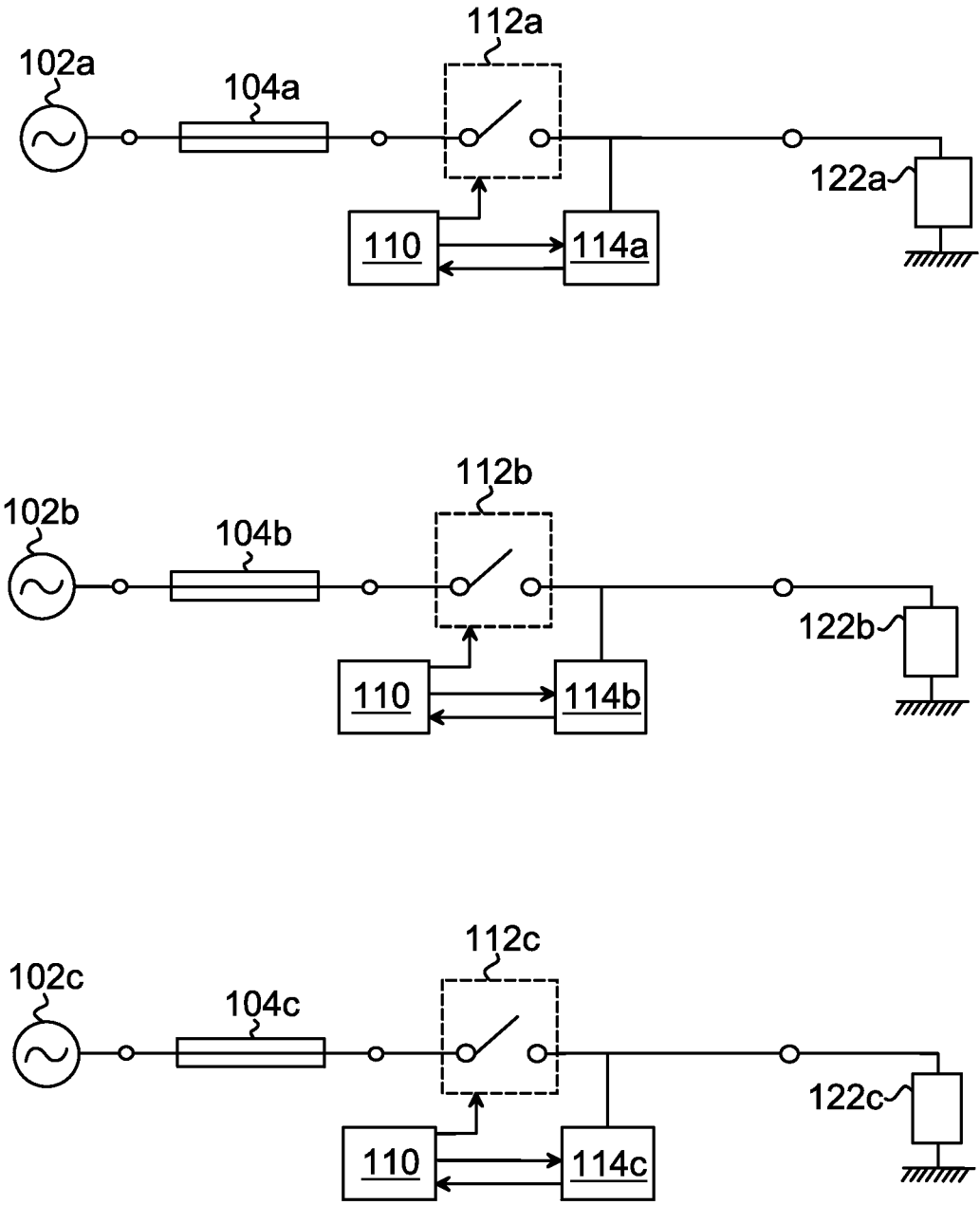
FIG. 3 shows three sets of the system of FIG. 1 for a three-phase system.

FIG. 3 shows three sets of the system of FIG. 1 for a three-phase system. There are three power sources 102a-c, three transmission lines 104a-c, three controllers 110a-c, three switches 112a-c and three energy storage systems 114a-c which are the same as those described in conjunction with FIG. 1 above. Other components of FIG. 1 have been omitted for reasons of clarity of FIG. 3. In other words, there are three complete set-ups as described in conjunction with FIG. 1 above, one for each phase of a three phase system. It is to be noted that, although not shown, the voltage control of FIG. 2 can also be included in the three phase set-up of FIG. 3.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. An apparatus comprising:
a converter having an AC side and a DC side,
a switch adapted to be connected to a transmission line on a first side and said switch being adapted to be connected to a load on a second side, said second side also being connected to said AC side of said converter,
an energy storage device, connected to said DC side of said converter, and
a controller,
wherein in a first operating mode, said switch is closed, such that an energy storage current flows to or from said energy storage device to charge or discharge said energy storage device, respectively, using said converter for any necessary conversion between AC and DC, and
in a second operating mode, said switch is open, preventing current from flowing from said transmission line to said converter, and said energy storage device supplies a direct current which is converted to an alternating current by said converter,
wherein, said controller is configured to control, in said first operating mode, power transfer on said transmission line to correspond to a surge impedance loading of the transmission line through affecting said energy storage current, wherein the transmission line neither absorbs nor produces reactive power at the surge impedance loading of the transmission line,
wherein said apparatus is configured such that said power transfer on said transmission line to correspond to said surge impedance loading of said transmission line only occurs in said first operating mode and does not occur in said second operating mode, and
wherein said converter comprises series connected high voltage circuits with embedded short circuit failure mode controlled with a pulse width modulation circuit.

2. The apparatus according to claim 1, wherein, in said second operating mode, said controller is configured to control frequency and voltage of said alternating current provided to said load.

3. The apparatus according to claim 1, further comprising a voltmeter and an ammeter, both meters adapted to provide measurements to said controller.

4. The apparatus according to claim 1, wherein said switch is a transient free switch.

5. The apparatus according to claim 1, wherein said apparatus is configured to switch from said first operating mode to said second operating mode when said energy storage device is determined to be full.

6. The apparatus according to claim 1, wherein said apparatus is configured to switch from said second operating mode to said first operating mode when said energy storage device is determined to be below a threshold charge level.

7. The apparatus according to claim 1, wherein said controller is configured to control switching of said apparatus between said first and second operating modes.

8. The apparatus according to claim 2, further comprising a voltmeter and an ammeter, both meters adapted to provide measurements to said controller.

9. A method for operating an apparatus comprising:
a converter having an AC side and a DC side,
a switch adapted to be connected to a transmission line on a first side and said switch being adapted to be connected to a load on a second side, said second side also being connected to said AC side of said converter,
an energy storage device, connected to said DC side of said converter,
said method comprising the steps of:
closing said switch, such that an energy storage current flows to or from said energy storage device to charge or discharge said energy storage device, respectively, using said converter for any necessary conversion between AC and DC,
opening said switch, preventing current from flowing from said transmission line to said converter, and said energy storage device supplies a direct current which is converted to an alternating current by said converter, and
controlling, when said switch is closed, power transferred on said transmission line to correspond to a surge impedance loading of the transmission line through affecting said energy storage current, wherein the transmission line neither absorbs nor produces reactive power at the surge impedance loading of the transmission line,
wherein said controlling the power transfer on said transmission line to correspond to said surge impedance loading only occurs when said switch is closed and does not occur when said switch is open, and
wherein said converter comprises series connected high voltage circuits with embedded short circuit failure mode controlled with a pulse width modulation circuit.

10. The method according to claim 9, wherein said closing and opening of said switch are repeated.

11. The method according to claim 9, wherein said opening of said switch is performed when said energy storage device is determined to be full.

12. The method according to claim 9, wherein said closing is performed when said energy storage device is determined to be below a threshold charge level.

13. The method according to claim 9, further controlling frequency and voltage of said alternating current provided to said load when said switch is opened.

* * * * *